United States Patent [19]

Schmitt et al.

[11] Patent Number: 4,481,974
[45] Date of Patent: Nov. 13, 1984

[54] SAFETY VALVE WITH FRICTION MEANS FOR DAMPING VALVE VIBRATION

[75] Inventors: Manfred Schmitt, Friedelsheim; Emil Zitzelsberger, Heppenheim/Kirschhausen, both of Fed. Rep. of Germany

[73] Assignee: Bopp & Reuther GmbH, Mannheim, Fed. Rep. of Germany

[21] Appl. No.: 424,977

[22] Filed: Sep. 27, 1982

[30] Foreign Application Priority Data

Mar. 24, 1982 [DE] Fed. Rep. of Germany ....... 3210768

[51] Int. Cl.³ .............................................. F16K 17/04
[52] U.S. Cl. .................................... 137/514; 137/542; 188/67; 188/381; 251/64
[58] Field of Search ................. 137/514, 542, DIG. 5; 188/67, 381; 251/64

[56] References Cited

U.S. PATENT DOCUMENTS

| | | | |
|---|---|---|---|
| 1,608,392 | 11/1926 | Hannah | 188/67 X |
| 2,017,297 | 10/1935 | Sorensen | 137/DIG. 5 |
| 3,848,632 | 11/1974 | Powell | 137/514 |
| 4,194,527 | 3/1980 | Schonwald | 137/514 |
| 4,357,956 | 11/1982 | Anselmann | 137/514 |

FOREIGN PATENT DOCUMENTS

| | | | |
|---|---|---|---|
| 2654077 | 11/1976 | Fed. Rep. of Germany . | |
| 1159648 | 2/1958 | France | 188/67 |
| 477276 | 7/1975 | U.S.S.R. | 137/514 |

*Primary Examiner*—Robert G. Nilson
*Attorney, Agent, or Firm*—Michael J. Striker

[57] ABSTRACT

A safety valve has movable and immovable valve elements, and a friction unit arranged therebetween for damping vibrations, wherein the friction unit has a plurality of friction members movable radially relative to a valve axis, a pressing member arranged to move the friction members so that their friction surfaces are pressed against a friction countersurface of a movable valve element of the movable valve means and for abutment against a stationary abutment member at their side facing toward a valve closing member, and a pretensioned auxiliary spring acting upon the friction members at their side facing away from the valve closing member and in a valve closing direction, wherein the auxiliary spring has such force and such a smaller resistance that in the event of seizing of the friction members with the movable valve element, the auxiliary spring is compressed within a predetermined opening pressure which does not considerably exceed a response pressure over approximately a valve stroke.

11 Claims, 5 Drawing Figures

SAFETY VALVE WITH FRICTION MEANS FOR DAMPING VALVE VIBRATION

BACKGROUND OF THE INVENTION

The present invention relates to a safety valve with a mechanical friction means between stationary valve parts and movable valve parts for opening and closing the valve, for damping the valve vibrations. A friction force which acts during opening or closing steps on the movable valve part insignificantly brakes the movement of the valve parts. Thereby oscillations of the movable parts which are caused by vibrations taking place additionally to the opening or closing movement, are damped in their amplitude.

The U.S. Pat. No. 3,848,632 discloses a spring-loaded excess pressure valve with a mechanical friction means for damping the valve vibrations. In this valve a valve shaft movable with a valve closing body has a groove which is in open communication with a medium pressure prior to the valve and accommodates an elastic O-ring which under the action of the medium pressure frictionally abuts against a cylindrical wall of a stationary guiding sleeve. This construction possesses the disadvantage that in the event of very small vibration amplitudes, for example of several tenths of millimeters, the O-ring also elastically performs these vibration movements. Therefore only small inner fulling work of the elastic material and not the high friction force acts in this case so that the vibration damping is low. Moreover, this safety function of this valve is in question when the O-ring is "seized" with the abutting cylindrical wall of the stationary guide sleeve, for example when the valve does not operate for a long time.

In addition, the known O-ring is more or less strongly clamped between the lateral walls of the annular groove by the medium pressure, therefore it cannot be determined which part of the outer braking force of the medium is absorbed by the lateral walls and which part is finally transmitted as a friction force to the friction counter surface. Also, the friction action of this O-ring in the valve of greater nominal widths and/or higher pressure is smaller. and this can lead to overheating because of the small mass of the O-ring. Because of tolerances in hardness and temperature action, a constant friction force of the O-ring is also questionable.

The German Auslegeschrift No. 2,654,077 discloses a spring-loaded pressure limiting valve which has an abutment member provided for adjusting of tensioning of the valve spring and a guide rod connected with a movable valve plate and extending through an opening of the abutment member, wherein the abutment member and the guide rod are tilted relative to one another in frictional manner. The tilting of the abutment member and the guide rod is performed under the action of an adjustment screw eccentrically engaging the abutment. With this friction means, the valves can no longer open when the guide rod is seized in the abutment and/or in upper or lower guide bearings because of the tilting. Moreover, because of unavoidable manufacturing play in the opening of the abutment and the guide rod different surface pressure takes place during inclination and in the event of high surface pressure high wear takes place on the friction faces and in the bearings of the guide rod because of the transverse forces acting during the inclination. Thereby a constant friction force is not guaranteed.

In addition, in this known friction means the guide rod is always somewhat inclined because of the tilting, so that the closing member which is fixedly connected therewith either provides for an insufficient closing or must be formed resilient. Also, the tilting can be unintentionally reduced or increased under the action of transverse forces which take place in the valve flow.

SUMMARY OF THE INVENTION

Accordingly, it is an object of the present invention to provide a safety valve with vibration damping means, which avoids the disadvantages of the prior art.

More particularly, it is an object of the present invention to provide a safety valve with vibration damping means, which guarantees a predetermined friction force between friction faces over a long time, and in the event of an unintentional seizing of the cooperating friction forces the valve opens within the permissible opening pressure.

In keeping with these objects and with others which will become apparent hereinafter, one feature of the present invention resides, briefly stated, in a safety valve in which friction means arranged between immovable valve parts and movable valve parts for damping valve vibrations includes at least one friction unit which has a plurality of friction members with friction surfaces and movable relative to a valve axis, a pressing member arranged to move the friction members so that the friction surfaces of the friction members are pressed against a friction countersurface of a movable valve element and so that the friction members abut against a stationary abutment member at their side facing towards a valve closing member, and a pretensioned auxiliary spring acting upon the friction members at their side facing away from the valve closing member and in a valve closing direction, wherein the auxiliary spring has such a force and such a small resistance that in the event of seizing of the friction surfaces of the friction members with the friction countersurface of the movable valve element, the auxiliary spring is compressed from the friction members within a permissible opening pressure which does not considerably exceed a response pressure over approximately a valve stroke.

With the utilization of the friction members which are formed as friction jaws, relatively great surfaces can be pressed against one another with small specific surface pressure and thereby small wear and high heat conduction. Since several friction members which are radially movable relative to the valve axis are provided, the pressing forces acting transverse to the movement direction of the valve part can be equalized relative to one another, so that no tilting moment is transmitted to the movable valve parts.

The prestressed auxiliary spring which acts on the friction members compensates the entire guide play in the movement direction of the valve part, on the one hand. On the other hand, opening of the safety valve is guaranteed also in the event of "seizing" of the friction members with the friction countersurfaces of the movable valve part within the admissible opening pressure, inasmuch as the auxiliary spring is again compressed because of this small spring force and its small resistance with taking along the friction members over the complete valve stroke in a valve opening direction. Since the pressing force for the friction members cannot generate a tilting moment, the valve spindle is free from undesirable lateral friction and thereby a predetermined friction force can be attained.

In accordance with a further feature of the present invention, the above-mentioned pretensioned auxiliary spring serves simultaneously as the pressing member for the friction members. Thereby separate pressing means for the friction members is dispensed with. The friction members have wedge-shaped inclined faces which cooperate with inclined faces on the abutment member and also on a pressing piece located between the auxiliary spring and the friction member. As a result of this, the force of the auxiliary spring is deflected in simple manner and play-free in the pressing direction of the friction members which is transverse to the movement direction of the valve part. The exactly pretensioned auxiliary spring guarantees a predetermined friction force for a long time, which remains constant even in the event of eventual small wear of the friction faces or the wedge face pairs, since the auxiliary spring provides for compensation of play.

Still another feature of the present invention is that several friction units are arranged one behind the other with interposition between them the pressing pieces provided with wedge counterfaces for the inclined faces of the friction members, and a common auxiliary spring is provided for all friction units to load the latter in friction face-pressing direction. Thereby the friction force is considerably increased or multiplied. With the predetermined friction force on the friction faces, the force of the auxiliary spring and its resistance can be respectively reduced, so that the auxiliary spring in the event of an undesirable "seizing" of the friction faces can be easily compressed back within the permissible opening pressure by approximately the valve stroke.

A further feature of the present invention which provides for an especially simple and space economical construction of the friction means is that the friction members are formed as annular segment with inner circular friction surfaces engaging the countersurface of the valve spindle in friction engagement. The circular friction surfaces of the annular segments engage over a great area with the outer surface of the valve spindle, so that no wear takes place and the friction heat can be withdrawn very fast.

Still a further feature of the present invention is that the annular segments have a spherical outer surface, and the abutment member and the pressing piece are formed as pressing rings lying with their inclined faces on the outer surface. Thereby the annular segments are held in a cage-like manner by the abutting pressing ring, and the cooperation of the pressing ring—inclined faces with the spherical outer surface of the annular segments guarantees a constant and wear-free transmission of the force of the auxiliary spring. A not exactly central engagement of the auxiliary spring with the wedge counter faces because of manufacture tolerances or manufacturing tolerances of the wedge counter faces themselves are compensated by respective displacement of the contact places on the spherical outer surface of the annular segment.

Yet another feature of the present invention is that the pressing rings provided between the individual friction units have two inclined faces which form a cage-like holding for the additional friction units and provide for a constant and wear-free transmission of the force of the auxiliary spring, as well as a support on the curved outer surfaces of the additional annular segments regardless of manufacturing tolerances.

Yet a further feature of the present invention is that the annular segments are provided at their outer surface with a circumferential groove which receives a spring ring. Thereby the annular elements can be easily assembled for mounting and dismounting so as to form frictional units which surround the valve spindle.

During opening stroke of the valve, the friction force acts in direction which is opposite to the direction of auxiliary spring force and partially unloads the wedge counterfaces at the side of the friction members facing toward the closing member. During the closing stroke the friction force acts in the direction of the auxiliary spring force. As a result of this, a smaller friction force is transmitted during the opening stroke as compared with the friction force transmitted during the closing stroke to the wedge counterfaces. This different friction force during opening and closing strokes is compensated when the safety valve is designed in accordance with a further feature, wherein the inclined faces have different angles $\alpha$ and $\beta$ relative to the movement direction of the valve spindle.

The tensioning of the auxiliary spring can be adjusted by an adjusting element. As a result of this, the friction force can be adjusted for providing a favorable value for vibration damping.

The friction unit or the friction units together with the abutment member and the pressing piece or pressing pieces and the auxiliary spring can be accommodated, in accordance with a further feature of the present invention, in a hollow insert arranged in a valve spring housing. Thereby the parts of the friction means are assembled in a protected structural unit. When the response pressure of the valve spring must be adjusted, the tensioning of the auxiliary spring is not affected inasmuch as the entire structural unit displaces downwardly during the adjustment of the valve spring. The structural units can be then easily inserted in the available safety valve.

The friction members and/or the abutting movable valve parts are composed of the material with high friction properties, particularly having a minimum differential between its rest friction and motion friction. As a result of this the initial phase of movement of the valve parts is not disadvantageously decelerated as a result of easy overcoming of the rest friction. During opening or closing movements the movable valve parts are braked sufficiently in the sense of vibration damping.

Finally, an additional feature of the present invention is that the friction members and/or the abutting movable valve parts are composed of a base material with high heat conductive properties and provided with a cover layer of a material with high friction properties. Thereby these parts provide for proper withdrawal of friction heat combined with high friction properties of the cover layer.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
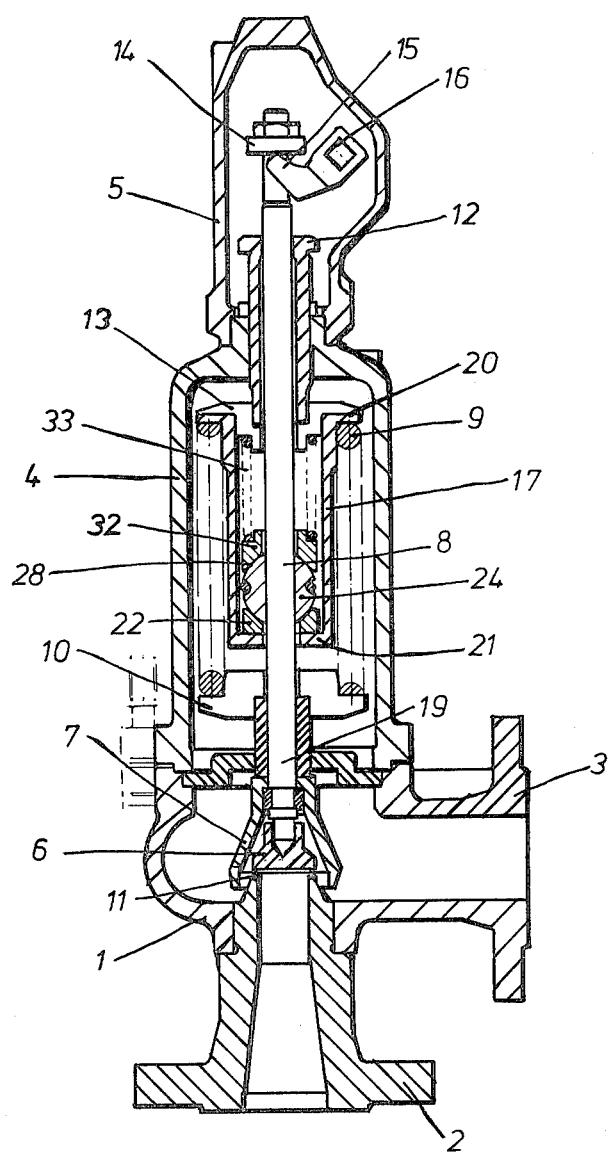
FIG. 1 is a view showing a longitudinal section of a spring loaded safety valve with friction means accommodated in a valve spring housing.

A safety valve shown in FIG. 1 has a valve housing identified by reference numeral 1 and provided with an inlet pipe 2 and an outlet pipe 3. A spring casing 4 is arranged on the housing 1 and sealingly closed from above by a cover 5.

The valve has movable valve parts which are susceptible to vibrations and include a valve closing piece 6 with a bell member 7, a valve spindle 8, a valve spring 9, and a lower valve plate 10 provided for the valve spring 9 and supported on the valve spindle 8. The valve closing piece 6 is pressed by the force of the valve spring 9 constantly in a valve closing direction, or in other words in a direction toward a valve seat 11.

When the medium pressure in the inlet pipe 2 exceeds the response pressure of the valve, the valve closing piece 6 is lifted from the valve seat 11 and the medium can flow out via the outlet pipe 3. The adjustment of the response pressure is performed by a tightening screw 12 which acts via an upper spring plate 13 upon the valve spring 9. The valve spindle 8 is provided at its upper end with an abutment 14, and a cam 15 of a lifting device 16 for opening the valve by hand engages the abutment 14.

Figure 2:
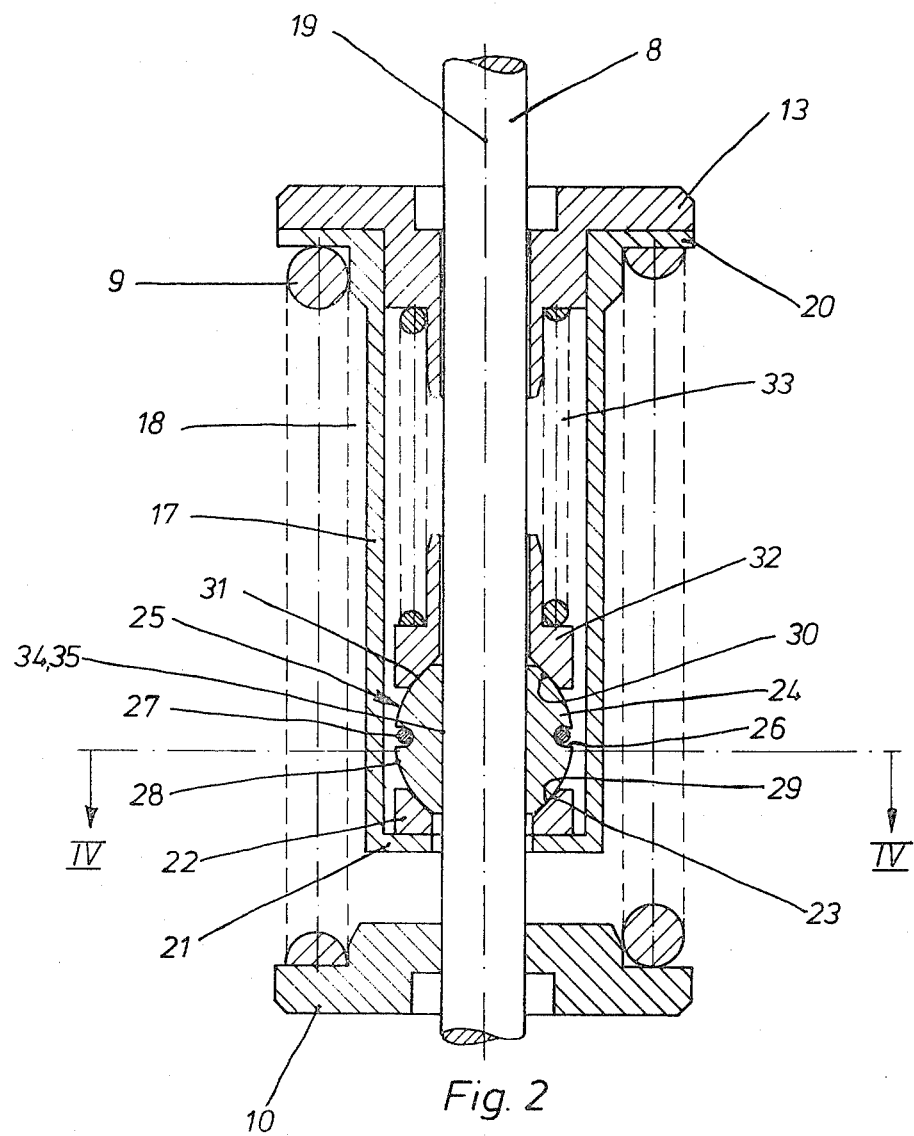
FIG. 2 is an enlarged view showing a longitudinal section of the friction means of FIG. 1.

As can be seen from FIGS. 1 and 2, friction means is arranged in direction of a valve axis 19 and accommodated in a hollow insert 17 received in an inner chamber 18 of the valve spring 9. A flange 20 of the insert 17 is clamped between the upper spring plate 13 and the valve spring 9, and the insert 17 hangs in the inner chamber 18 so that a bottom 21 of the insert supports an abutment member 22 of the friction means. The abutment member 22 is formed as a pressing ring having a conical or inclined face 23 arranged so that a friction unit 25 composed of several annular segments 24 abuts against this face. The annular segments 24 surround the valve spindle 8 and held by a spring ring 27 received in grooves 26.

An outer surface 28 of the annular segments 24 is spherical and forms a curved outer face which is provided at its side facing toward the valve closing piece 6 with inclined faces 29 acting in a wedge-like manner. The conical or inclined face 23 of the abutment member 22, formed as a wedge counterface engages with the inclined faces 29.

The outer surface of the annular segments 24 also has inclined faces 30 at its side facing away from the valve closing piece. A pressing ring 32 is located at this side of the annular segments 24 and has a conical or inclined face 31 lying on the inclined faces 30 of the annular segments 24. A pretensioned auxiliary spring 33 is arranged between the upper spring plate 13 and the pressing ring 32 inside the insert 17. The auxiliary spring 33 has a spring force which acts in direction of the valve axis 19 and more particularly in the valve closing direction. The auxiliary spring 33 presses onto the wedge pairs 31,30 and 29,23 and the spring force is deflected in the pressing direction which is transverse to the movement direction of the valve spindle 8 and acts as pressing force upon the inner circular friction surfaces 34 of the friction members 24. The outer surface of the valve spindle 8 forms in the region of the annular segment 24 a friction countersurface 35 of the movable valve part.

Figure 4:
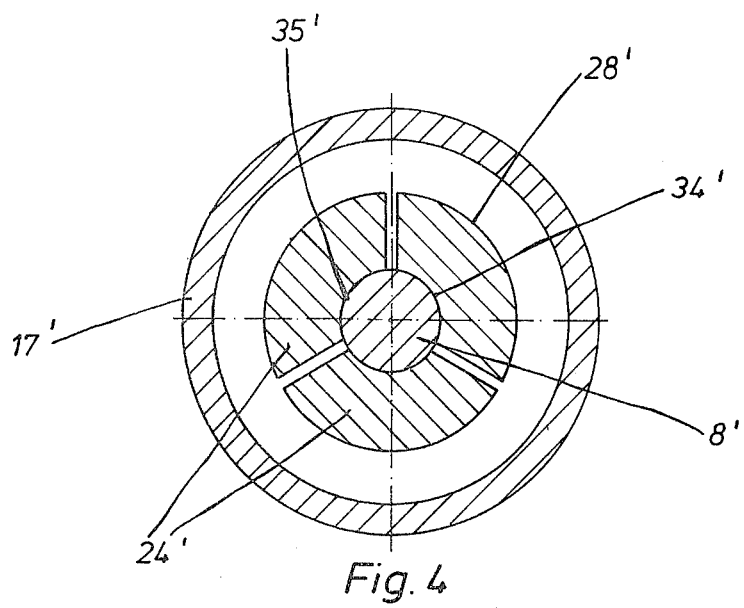
FIG. 4 is a view showing a section taken along the line 4—4 in FIG. 2.

The cross-section of the annular segments 24 which surrounds the valve spindle 8 is shown in FIG. 4. It can be seen that the three annular segments 24 lie with their inner circular friction surfaces 34 over a great area on the outer surface of the valve spindle 8 forming the friction countersurface 35.

Figure 3:
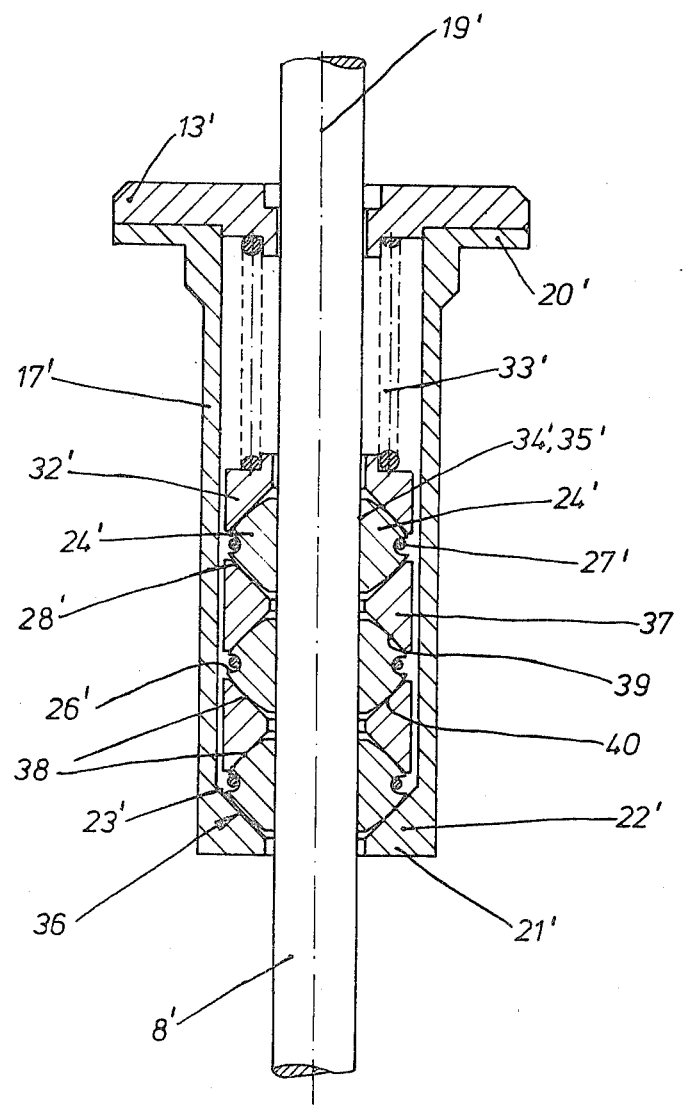
FIG. 3 is a view substantially corresponding to the view of FIG. 2 but showing another embodiment of the present invention.

In the embodiment shown in FIG. 3, several friction units 36 are arranged one behind the other in the movement direction of a movable valve spindle 8'. A pressing ring 37 is provided between the individual friction units 36 and has double conical or inclined faces 38. They lie as wedge counterfaces on curved outer surface 28' of two neighboring annular segments 24'. An auxiliary spring 33' is arranged behind the last friction unit 36 over a pressing ring 32'.

The friction unit 36 are lens-shaped and have an upper spherical face 39 and a lower spherical face 40 connected with one another by a round intermediate portion. A center of the spherical faces is located on a valve axis 19', so that a force-equalizing displacement of the contact places between the wedge pairs is possible. Because of the lens-shaped design of the friction units 36, they are lower than the friction units with completely spherical outer surfaces. As a result of this, the friction members located one behind the other require a smaller height therefor.

Figure 5:
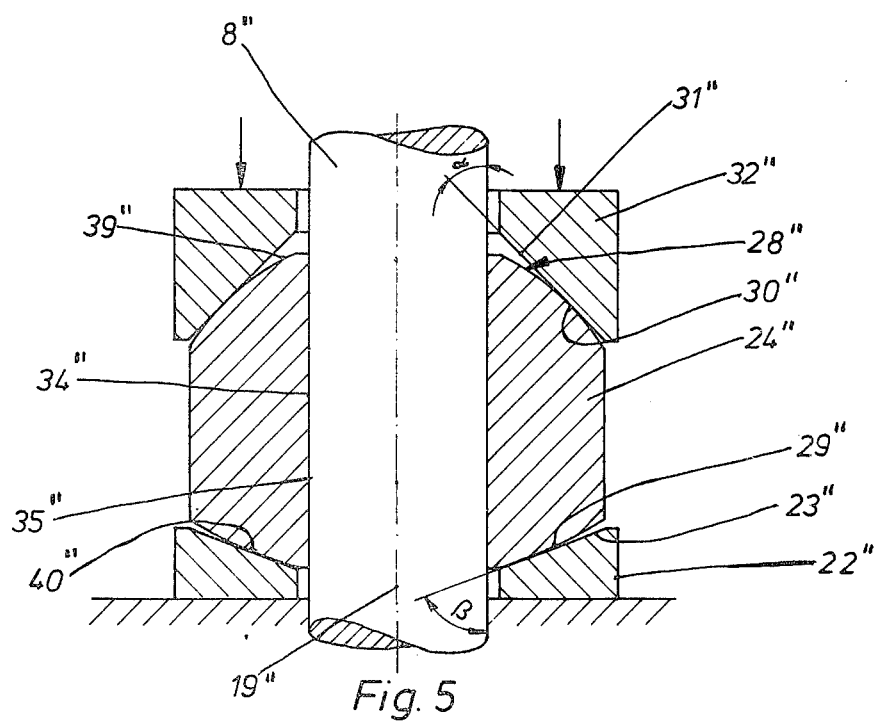
FIG. 5 is a view showing the friction means in accordance with still another embodiment of the present invention.

FIG. 5 shows a friction means in which the pressing rings 22" and 32" abut with their conical faces 23" and 31" on the spherical outer surface 28" of the annular segments 24", wherein the inclined or conical faces 23" and 31" have different acute angles $\alpha$ and $\beta$ relative to the movement direction of the valve spindle 8. More particularly, the angle $\alpha$ is smaller than the angle $\beta$. Because of this identical friction forces on the valve spindle 8 are obtained during the opening stroke and the closing stroke of the valve. For providing a maximum possible contact at the contact locations between the pressing rings 32" and the annular segments 24" on the one hand, and between the abutment member 22" and the annular segments 24" on the other hand, despite the different angles $\alpha$ and $\beta$, the outer surface 28" of the annular segments 24" at both spherical faces 39" and 40" is formed with different radii.

The different acute angles $\alpha$ and $\beta$ may also be provided in the embodiment of FIG. 3. In this case the pressing ring 37 has the inclined face 38 which abuts against the annular segments 24' (of the friction unit located above this pressing ring) at their side facing toward the valve closing piece 6 with the angle $\beta$. The same pressing ring 37 has the second inclined face 38 which abuts against the annular segments (of the friction unit located under the same pressing ring) at their side facing away from the valve closing piece 6 with the angle $\alpha$. The angle $\alpha$ is smaller than the angle $\beta$.

It will be understood that each of the elements described above, or two or more together, may also find a useful application in other types of constructions differing from the types described above.

While the invention has been illustrated and described as embodied in a safety valve with vibration damping means, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of the present invention.

What is claimed as new and desired to be protected by Letters Patent is set forth in the appended claims.

1. A safety valve, comprising
  valve means having an axis, immovable valve parts, and movable valve parts including a movable valve element provided with a valve closing member and movable in a vlave stroke between open and closed positions; and
  friction means arranged between said immovable valve parts and said movable valve parts for damping vibrations of said valve means, said friction means including at least one friction unit having a plurality of friction members with friction surfaces and movable radially relative to said axis, a stationary abutment member, a pressing member arranged to move said friction members so that said friction surfaces of said friction members are pressed against a friction countersurface of said movable valve element and so that said friction members abut against said abutment member at their side facing toward said valve closing member, and a pretensioned auxiliary spring acting upon said friction members at their side facing away from said valve closing member and in a valve closing direction,
  said auxiliary spring having such a force and such a small resistance that in the event of undesired seizing of said friction surfaces of said friction members with said friction countersurface of said movable valve element said auxiliary spring is compressed away from said friction members over the valve stroke in a valve opening direction and within a pressure premissible for a valve opening, each of said friction members having two faces which face toward and away of said valve closing member, respectively, at least one of said faces of each of said friction members being inclined and acting in a wedge-like manner, said friction means further including at least one pressing piece arranged between said friction members and said auxiliary spring, at least one of said abutment member and said pressing piece having corresponding wedge counterfaces with which said inclined faces of said friction members cooperate for transmitting the force of said auxiliary spring to said friction surfaces of said friction members.

2. An arrangement as defined in claim 1, wherein both said abutment member and said pressing piece are provided with said wedge counterfaces with which said inclined faces of said friction members cooperate.

3. An arrangement as defined in claim 1, wherein said friction means includes a plurality of the friction units arranged adjacent to one another in a movement direction of said movable valve element, and a plurality of the pressing pieces each arranged between two neighboring friction units and having two said wedge counterfaces each cooperating with said inclined faces of said friction members of a respective one of said two neighboring friction units, said auxiliary spring being common for all said friction units and acting upon a last one of said friction units at its side facing away from said closing valve member.

4. An arrangement as defined in claim 3, wherein said movable valve element is formed as a valve spindle having an outer surface which forms said friction countersurface, said friction members of said friction units being formed as annular segments having inner circular surfaces which form said friction surfaces and cooperate with said outer surface of said valve spindle with frictional engagement, said annular segments having an outer surface which is at least partially spherical and provided with inclined faces facing toward and away of said valve closing member, respectively, said pressing rings including pressing rings which are located between said friction units and each has two inclined outer faces lying as wedge counterfaces on said outer surface of the friction members of two neighboring friction units.

5. An arrangement as defined in claim 1, wherein said movable valve element is formed as a valve spindle having an outer surface which forms said friction countersurface, said friction members being formed as annular segments having inner circular surfaces which form said friction surfaces and cooperate with said outer surface of said valve spindle with frictional engagement.

6. An arrangement as defined in claim 5, wherein each of said annular segments has an outer surface which is at least partially spherical and provided with inclined faces facing toward and away of said valve closing member, respectively, said abutment member being located at one side of said annular segments, said friction means including a pressing piece located at an opposite side of said annular segments, said valve abutment member and said pressing piece being formed as pressing rings and each having at its side facing toward said annular segments an inclined face formed as a wedge.

7. An arrangement as defined in claim 6, wherein said outer surface of each of said annular segments is spherical.

8. An arrangement as defined in claim 6, wherein the inclined face of the pressing ring formed by said valve abutment member abuts against said outer surfaces of said annular segments with a predetermined angle $\beta$ to a movement direction of said movable valve member, the inclined face of the pressing ring formed by said pressing piece abutting against said outer surfaces said annular segments with an angle $\alpha$ to the movement direction of said movable valve member which is smaller than said angle $\beta$.

9. An arrangement as defined in claim 6, wherein said friction means also includes a second such friction unit having a plurality of such friction members with such an outer surface which is at least partially spherical and provided with such inclined faces facing toward and away of said valve closing member, said friction units and thereby their annular segments being located at opposite axial sides of said pressing piece, the inclined face of said pressing piece abutting against the outer surfaces of the annular segments of one friction unit at their side facing toward said valve closing member with a predetermined angle $\beta$ to a movement direction of said movable valve member, the inclined face of said pressing piece abutting against the outer surfaces of the annular segments of the outer friction unit at their side facing away of said valve closing member with an angle α to the movement direction of said movable valve member which is smaller than said angle β.

10. An arrangement as defined in claim 5, wherein each of said annular segments has an outer surface which is at least partially spherical and provided with a circumferential groove, said friction means including a spring ring arranged in said circumferential groove and assembling said annular segments in said friction unit which surrounds said movable valve element.

11. An arrangement as defined in claim 1, wherein said valve means has a valve housing bounding a valve chamber, a valve spring in said valve chamber, and a valve plate spaced from said valve closing member, said friction means including a hollow insert accommodating said friction unit, said hollow insert having a flange arranged between said valve plate and said valve spring and a body part extending into said chamber and having a bottom wall which supports said abutment member.

* * * * *